US012057087B2

(12) United States Patent
Ozawa

(10) Patent No.: US 12,057,087 B2
(45) Date of Patent: Aug. 6, 2024

(54) DISPLAY APPARATUS AND SOURCE DRIVER

(71) Applicant: LAPIS Technology Co., Ltd., Yokohama (JP)

(72) Inventor: Shunsuke Ozawa, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/471,603

(22) Filed: Sep. 21, 2023

(65) Prior Publication Data

US 2024/0105141 A1 Mar. 28, 2024

(30) Foreign Application Priority Data

Sep. 26, 2022 (JP) ................................ 2022-152399

(51) Int. Cl.
*G09G 5/00* (2006.01)

(52) U.S. Cl.
CPC ..... *G09G 5/003* (2013.01); *G09G 2310/0237* (2013.01); *G09G 2310/0243* (2013.01); *G09G 2310/0291* (2013.01); *G09G 2310/06* (2013.01)

(58) Field of Classification Search
CPC ........... G09G 5/003; G09G 2310/0237; G09G 2310/0243; G09G 2310/0291; G09G 2310/06
See application file for complete search history.

(56) References Cited

U.S. PATENT DOCUMENTS

| | | | | |
|---|---|---|---|---|
| 9,024,978 | B2 * | 5/2015 | Sehata | G09G 3/2007 345/694 |
| 10,896,650 | B2 * | 1/2021 | Saitoh | G09G 3/3688 |
| 2006/0232539 | A1 * | 10/2006 | Hashimoto | G09G 3/3688 345/96 |
| 2007/0115271 | A1 * | 5/2007 | Seo | G09G 3/3688 345/204 |
| 2008/0100605 | A1 | 5/2008 | Shirai et al. | |
| 2017/0061928 | A1 * | 3/2017 | Kim | G09G 3/3685 |

FOREIGN PATENT DOCUMENTS

JP 2008107655 A 5/2008

* cited by examiner

*Primary Examiner* — Stephen G Sherman
(74) *Attorney, Agent, or Firm* — Rabin & Berdo, P.C.

(57) ABSTRACT

A display apparatus includes a plurality of source drivers outputting a gradation voltage signal and a selector switchably supplying the output gradation voltage signal to a plurality of data lines. The plurality of source drivers include a first source driver that has a first output buffer outputting a switching signal and a second source driver that has a second output buffer. The first output buffer has first and second transistors coupled via output terminals of the switching signal and turned ON and OFF complementarily. The second output buffer has third and fourth transistors coupled via output terminals of the switching signal and turned ON and OFF complementarily. The first and the second output buffers have the output terminals electrically coupled, and the first source driver has an abnormal detection circuit detecting a state causing a flow-through current to occur between the output terminals.

7 Claims, 6 Drawing Sheets

| O1 | O2 | JD | DETERMINATION |
|---|---|---|---|
| H | L | H | ABNORMAL |
| L | H | H | ABNORMAL |
| L | L | L | NORMAL |
| H | H | L | NORMAL |

DISPLAY APPARATUS AND SOURCE DRIVER

CROSS-REFERENCE TO RELATED APPLICATION

This application is based upon and claims the benefit of priority from the prior Japanese Patent Application No. 2022-152399 filed on Sep. 26, 2022, the entire contents of which are incorporated herein by reference.

BACKGROUND

1. Technical Field

The disclosure relates to a display apparatus and a source driver.

2. Description of the Related Art

Recently, in association with horizontally lengthening of a display panel in a display apparatus, a specification in which a plurality of driver ICs configure a source driver is becoming mainstream. The plurality of driver ICs are arranged along an extending direction of gate lines, and, for example, the adjacent driver ICs are coupled in cascade.

In order for an output amplifier disposed in the driver IC to each be able to drive a plurality of data lines so as to suppress an increase in chip area, there is proposed a display apparatus that drives the data lines in a time divisional manner (for example, JP-A-2008-107655).

SUMMARY

In a display apparatus that drives data lines in a time divisional manner, a multiplex selector disposed between a source driver and a display panel sequentially switches the data lines as a driving target based on a select signal supplied from the source driver. When the source driver is configured of a plurality of driver ICs, the driver ICs positioned at both ends among the plurality of driver ICs arranged along the extending direction of the gate lines (hereinafter referred to as a left end driver IC and a right end driver IC) each supply the select signal to the multiplex selector.

A buffer that outputs the select signal is configured of a P-channel type MOS transistor (hereinafter referred to as a PMOS) and N-channel type MOS transistor (hereinafter referred to as a NMOS) in which, for example, respective drains are coupled so as to operate complementarily. An output of a buffer of the left end driver IC and an output of a buffer of the right end driver IC are coupled to one another via the multiplex selector and are short-circuited on a panel.

The respective buffers of the left end driver IC and the right end driver IC are preferred to operate such that the PMOSs and NMOSs are turned ON and OFF complementarily on the same timing as one another. The respective buffers, however, may have a time difference in operation timing due to, for example, a signal delay of a video signal supplied to the respective driver ICs. Due to this time difference, a flow-through current may occur between the output of the buffer of the left end driver IC and the output of the buffer of the right end driver IC.

For example, when there occurs a time difference between a timing at which the PMOS configuring the buffer of the left end driver IC is turned ON and a timing at which the PMOS configuring the buffer of the right end driver IC is turned ON, even though the PMOS is ON in the left end driver IC, a time at which the NMOS is turned ON occurs in the right end driver IC, and thus, a flow-through current between the buffers occurs. Similarly, even though the PMOS is ON in the right end driver IC, a time at which the NMOS is turned ON occurs in the left end driver IC, and thus, a flow-through current between the buffers occurs.

Thus, there is a problem of the occurrence of the flow-through current between the buffers due to the occurrence of time difference between the operation timings of the buffers of the driver ICs at both the ends. There also is a problem that Electro Magnetic Interference (EMI) noise may occur due to the occurrence of the flow-through current.

The disclosure has been made in consideration of the above-described problems, and an object of the disclosure is to provide a display apparatus that allows suppressing occurrence of the flow-through current between buffers outputting a select signal in a display apparatus that drives data lines in a time divisional manner based on the select signal from a source driver configured of a plurality of driver ICs.

According to the disclosure, a display apparatus comprises: a display that includes a plurality of data lines and a plurality of gate lines, and a plurality of pixel portions disposed in a matrix at respective intersecting portions of the plurality of data lines and the plurality of gate lines; a plurality of source drivers that each output a gradation voltage signal based on a video data signal; and a selector that receives a supply of a switching signal and switchably supplies the respective gradation voltage signals output from the plurality of respective source drivers to two or more data lines among the plurality of data lines according to the switching signal, wherein the plurality of source drivers include a first source driver that includes a first output buffer that outputs the switching signal and a second source driver that includes a second output buffer that outputs the switching signal, the first output buffer includes a first transistor and a second transistor that are coupled in a vertical row via a first node as an output terminal that outputs the switching signal and are turned ON and OFF complementarily upon receiving a voltage application on the respective control ends, the second output buffer includes a third transistor and a fourth transistor that are coupled in a vertical row via a second node as an output terminal that outputs the switching signal and are turned ON and OFF complementarily upon receiving a voltage application on the respective control ends, the first output buffer and the second output buffer have the respective output terminals electrically coupled to one another, and the first source driver includes an abnormal detection circuit that detects a state causing a flow-through current to occur between the output terminal of the first output buffer and the output terminal of the second output buffer.

According to the disclosure, a source driver coupled to a display panel having a plurality of data lines and a plurality of gate lines and a plurality of pixel portions disposed in a matrix at respective intersecting portions of the plurality of data lines and the plurality of gate lines, the source driver outputting a gradation voltage signal based on a video data signal, the source driver comprises: a plurality of driver ICs that are coupled to a selector that switchably supplies the gradation voltage signal output from the source driver to two or more data lines among the plurality of data lines according to a switching signal, and each output the gradation voltage signal, wherein the plurality of driver ICs include a first driver IC that has a first output buffer outputting the switching signal and a second driver IC that has a second output buffer outputting the switching signal, the first output buffer includes a first transistor and a second transistor that are coupled in a vertical row via a first node as an output terminal that outputs the switching signal and are turned ON and OFF complementarily upon receiving a voltage application on the respective control ends, the second output buffer includes a third transistor and a fourth transistor that are coupled in a vertical row via a second node as an output terminal that outputs the switching signal and are turned ON and OFF complementarily upon receiving a voltage application on the respective control ends, the first output buffer and the second output buffer have the respective output terminals electrically coupled, the first driver IC includes an abnormal detection circuit that detects a state causing a flow-through current to occur between the output terminal of the first output buffer and the output terminal of the second output buffer.

BRIEF DESCRIPTION OF THE DRAWINGS

Features of the disclosure will be described below with reference to the accompanying drawings.

DETAILED DESCRIPTION

Figure 1:
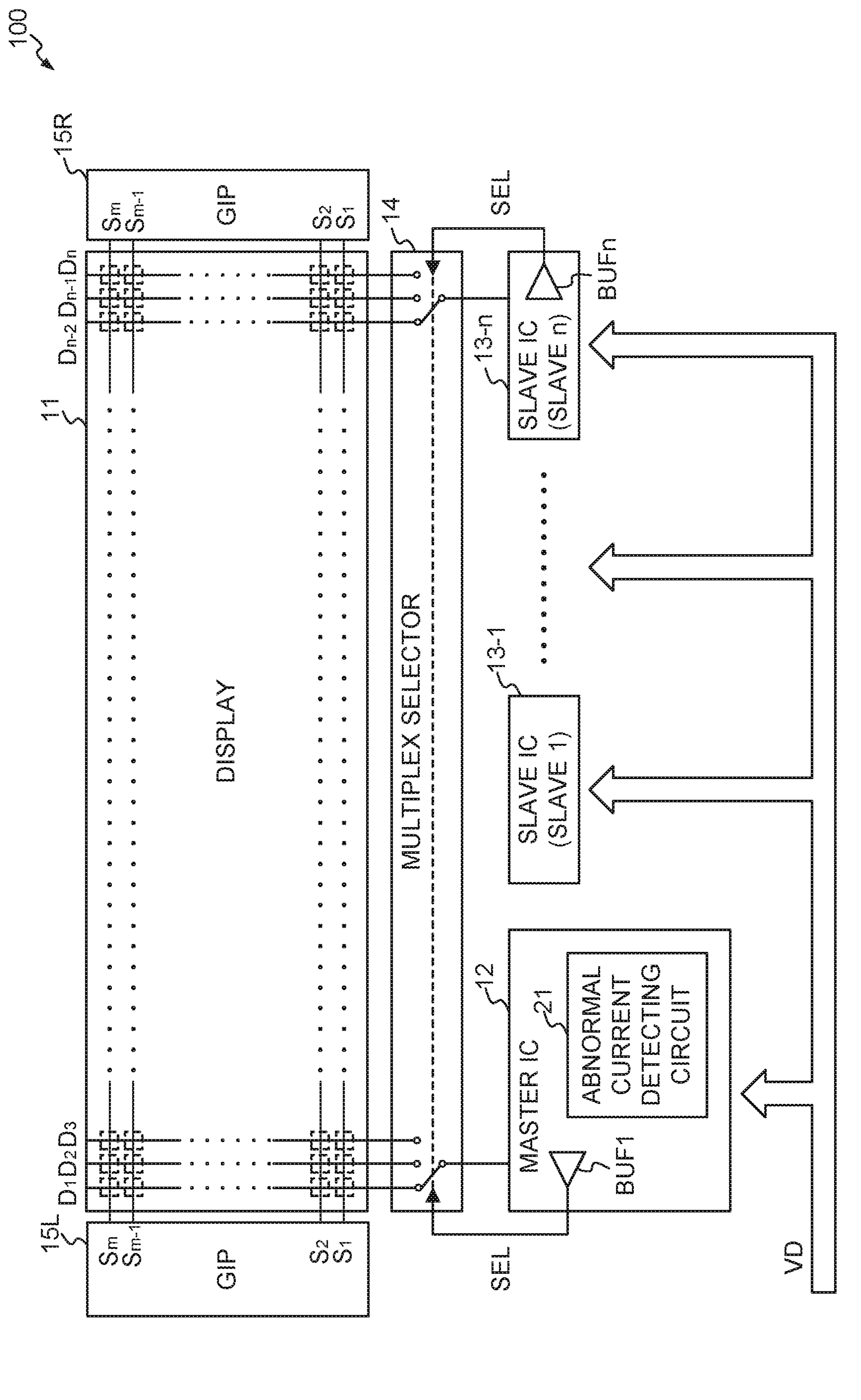
FIG. 1 is a block diagram illustrating a configuration of a display apparatus in Embodiment 1.

Preferred embodiments of the disclosure will be described in detail below. Note that the same reference numerals are given to substantially identical or equivalent parts in the description in the following respective embodiments and the accompanying drawings.

The display apparatus according to the disclosure allows suppressing occurrence of the flow-through current between the buffers outputting the select signal for controlling switching of the data lines in time-divisional driving.

Embodiment 1

FIG. 1 is a block diagram illustrating a configuration of a display apparatus 100 according to Embodiment 1 of the disclosure. The display apparatus 100 includes a display 11, a master IC 12, slave ICs 13-1 to 13-*n*, a multiplex selector 14, and GIPs 15L and 15R.

The display 11 is configured of a semiconductor substrate in which a plurality of pixel portions are arranged in a matrix. The display 11 includes a plurality of gate lines $S_1$ to $S_m$, which are horizontal scanning lines, and a plurality of data lines $D_1$ to $D_n$ disposed to intersect with and be perpendicular to the gate lines $S_1$ to $S_m$. The respective pixel portions are disposed at intersecting portions between the gate lines $S_1$ to $S_m$ and the data lines $D_1$ to $D_n$.

The master IC 12 and the slave ICs 13-1 to 13-*n* are a driver IC group that configures a source driver. The master IC 12 and the slave ICs 13-1 to 13-*n* are arranged along an extending direction of the gate lines $S_1$ to $S_m$.

Each of the master IC 12 and the slave ICs 13-1 to 13-*n* generates a gradation voltage signal to be applied to the pixel portion based on a video signal VD supplied from the outside. The master IC 12 and the slave ICs 13-1 to 13-*n* output the generated gradation voltage signals to the data lines $D_1$ to $D_n$. The video signal VD is, for example, supplied by data transmission by Low Voltage Differential Signaling (LVDS).

The multiplex selector 14 is disposed between the display 11 and the master IC 12 and slave ICs 13-1 to 13-*n*. The multiplex selector 14 is a selector that switchably supplies the gradation voltage signals output from the output amplifiers of the master IC 12 and slave ICs 13-1 to 13-*n* to a plurality of data lines (in this embodiment, three data lines per output amplifier). The multiplex selector 14 performs the switching based on select signals SEL supplied from the master IC 12 and the slave IC 13-*n*. This drives the data lines $D_1$ to $D_n$ in a time divisional manner.

The GIPs 15L and 15R are gate drivers mounted on the panel using a Gate In Panel (GIP) technique. The GIP 15L receives the supply of the gate control signal from the master IC 12, and sequentially supplies the gate signal to the gate lines $S_1$ to $S_m$ based on the clock timing included in the gate control signal. The GIP 15R receives the supply of the gate control signal from the slave IC 13-*n*, and sequentially supplies the gate signal to the gate lines $S_1$ to $S_m$ based on the clock timing included in the gate control signal.

Each of the master IC 12 and the slave ICs 13-1 to 13-*n* configuring the source driver has a plurality of output amplifiers for outputting the gradation voltage signal. This embodiment includes three data lines switchably coupled per output amplifier, and has a configuration in which the data lines can be driven in a time divisional manner corresponding to switching operation of the multiplex selector 14.

The master IC 12 and the slave IC 13-*n* positioned at both ends among the master IC 12 and the slave ICs 13-1 to 13-*n* arranged in the extending direction of the gate lines $S_1$ to $S_m$ supply a select signal SEL that controls switching timing of the multiplex selector 14 to the multiplex selector 14.

The master IC 12 incudes a buffer BUF1 for outputting the select signal SEL. The slave IC 13-*n* incudes a buffer BUFn for outputting the select signal SEL. In this embodiment, a timing controller (not illustrated in FIG. 1) disposed in the master IC 12 adjusts output timings of the select signal SEL from the buffer BUF1 and the buffer BUFn.

The master IC 12 also includes an abnormal current detecting circuit 21. The abnormal current detecting circuit 21 is a detection circuit that detects a state causing a flow-through current to occur between the buffer BUF1 of the master IC 12 and the buffer BUFn of the slave IC 13-*n*. The detection result (determination result) by the abnormal current detecting circuit 21 is supplied to the timing controller in the master IC 12.

Figure 2A:
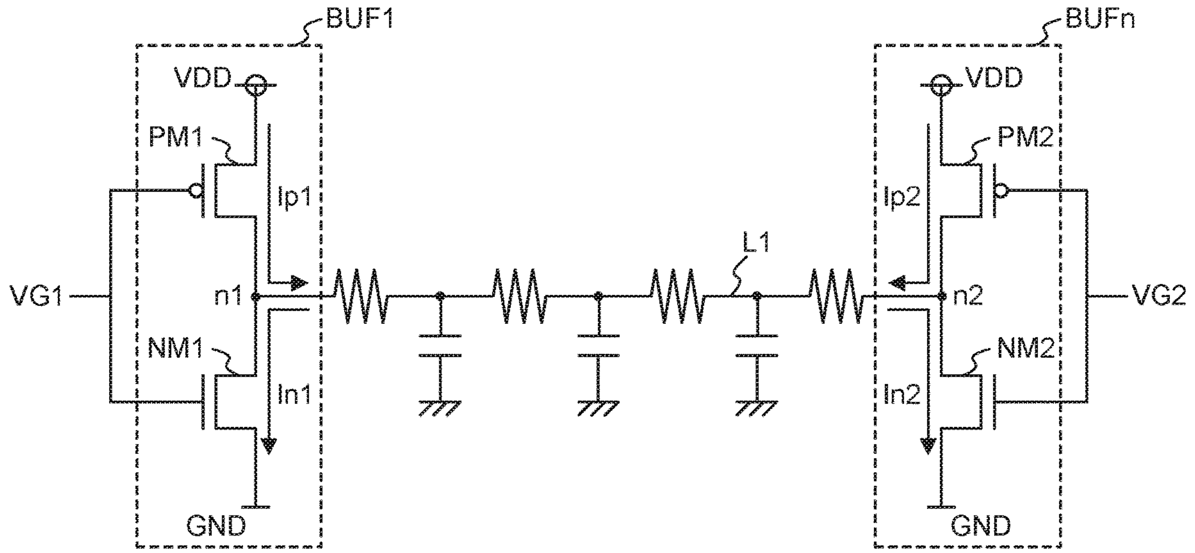
FIG. 2A is a drawing illustrating configurations of buffers in driver ICs at both ends.

FIG. 2A is a drawing illustrating configurations of the buffer BUF1 of the master IC 12 and the buffer BUFn of the slave IC 13-*n*.

The buffer BUF1 is configured of transistors PM1 and NM1. The buffer BUFn is configured of transistors PM2 and NM2. In this embodiment, the transistors each have the same size (gate width and gate length).

The transistor PM1 is a P-channel type MOS transistor (that is, a PMOS transistor), which is a first conductivity type. The transistor PM1 has a source coupled to a supply line of a power supply voltage VDD.

The transistor NM1 is an N-channel type MOS transistor (that is, an NMOS transistor), which is a second conductivity type. The transistor NM1 has a source grounded. The transistors PM1 and NM1 have respective drains coupled to one another via a node n1. The node n1 is a signal output terminal of the buffer BUF1. That is, the select signal SEL is output from the node n1, and is supplied to the multiplex selector 14.

The transistors PM1 and NM1 have respective gates to which a common input voltage VG1 is applied. Corresponding to the signal level of the input voltage VG1, the transistors PM1 and NM1 are turned ON and OFF complementarily. Specifically, when VG1 is in an L level (logical level 0), the transistor PM1 is turned ON and the transistor NM1 is turned OFF. When VG1 is in an H level (logical level 1), the transistor PM1 is turned OFF and the transistor NM1 is turned ON.

The transistor PM2 is a P-channel type MOS transistor (that is, a PMOS transistor), which is a first conductivity type. The transistor PM2 has a source coupled to a supply line of the power supply voltage VDD.

The transistor NM2 is an N-channel type MOS transistor (that is, an NMOS transistor), which is a second conductivity type. The transistor NM2 has a source grounded. The transistors PM2 and NM2 have respective drains coupled to one another via a node n2. The node n2 is a signal output terminal of the buffer BUFn. That is, the select signal SEL is output from the node n2, and is supplied to the multiplex selector 14.

The transistors PM2 and NM2 have respective gates to which a common input voltage VG2 is applied. Corresponding to the signal level of the input voltage VG2, the transistors PM2 and NM2 are turned ON and OFF complementarily. Specifically, when VG2 is in the L level (logical level 0), the transistor PM2 is turned ON and the transistor NM2 is turned OFF. When VG2 is in the H level (logical level 1), the transistor PM2 is turned OFF and the transistor NM2 is turned ON.

The node n1 as the signal output terminal of the buffer BUF1 and the node n2 as the signal output terminal of the buffer BUFn are short circuited via, for example, a wiring of the multiplex selector 14 on the panel configuring the display 11. In FIG. 2A, the coupling portion where the node n1 and the node n2 are short circuited is schematically illustrated as a coupling line L1. The resistances and the capacitances of the coupling line L1 in FIG. 2A represent the parasitic components of the wiring in the multiplex selector 14 and the parasitic capacitances of the changeover switch (transistor) as an equivalent circuit.

The buffer BUF1 and the buffer BUFn are preferred to operate such that the respective PMOS transistors and NMOS transistors are turned ON and OFF at the same timing. When a difference occurs between timings of the voltage changes of the input voltages VG1 and VG2, however, a difference occurs between timings of the operations of the buffers BUF1 and BUFn, and therefore, a flow-through current may occur in the coupling line L1.

Figure 2B:
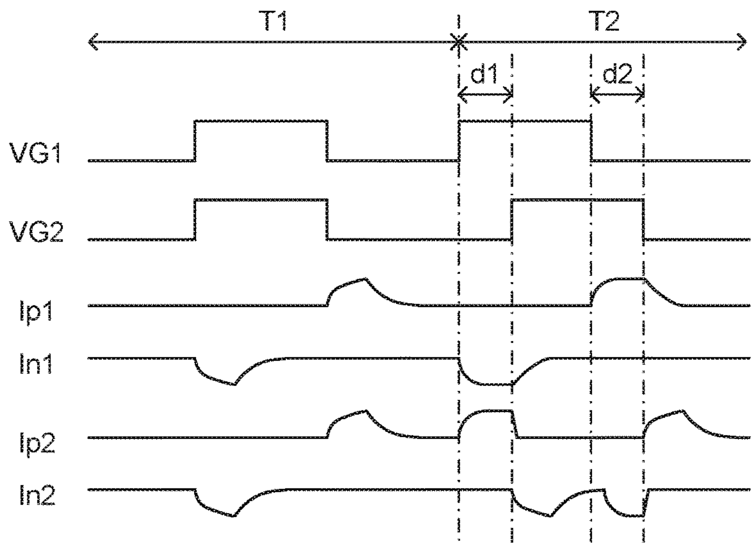
FIG. 2B is a timing chart illustrating changes in applied voltages of the buffers and occurrence of flow-through currents.

FIG. 2B is a timing chart illustrating temporal variations of input voltages and currents when there occurs a difference between timings of operations of the buffers BUF1 and BUFn.

In a time period T1, the difference between the timings of the voltage changes of the input voltage VG1 and the input voltage VG2 is not present, and they change to the H level and the L level on the same timing as one another. In view of this, the transistor PM1 of the buffer BUF1 and the transistor PM2 of the buffer BUFn, and the transistor NM1 of the buffer BUF1 and the transistor NM2 of the buffer BUFn are turned ON and OFF on the same timing as one another.

Accordingly, in the time period T1, the transistors NM1 and NM2 are turned ON at the timing where the transistors PM1 and PM2 are OFF, and a current In1 flows between drain and source of the transistor NM1 and a current In2 flows between drain and source of the transistor NM2. The transistors NM1 and NM2 are turned OFF at the timing where the transistors PM1 and PM2 are ON, and a current Ip1 flows between source and drain of the transistor PM1 and a current Ip2 flows between source and drain of the transistor PM2. Note that, since each transistor has the same size as described above, the current In1 and the current In2, and the current Ip1 and the current Ip2 respectively have the same signal waveforms.

A time period T2 is a time period in which a time difference is present between the timings of the voltage changes of the input voltage VG1 and the input voltage VG2. Immediately after the start of the time period T2, there is a time period d1 where the input voltage VG1 is in the H level and the input voltage VG2 is in the L level. In the time period d1, since the input voltage VG1 is in the H level, the transistor PM1 of the buffer BUF1 is in the state of being OFF and the transistor NM1 is in the state of being ON. On the other hand, since the input voltage VG2 is in the L level, the transistor PM2 of the buffer BUFn is in the state of being ON and the transistor NM2 is in the state of being OFF. Accordingly, what is called a flow-through current, which is a current that flows from the transistor PM2 toward the transistor NM1 via the coupling line L1, occurs.

In a time period d2, the input voltage VG1 is in the L level and the input voltage VG2 is in the H level. Since the input voltage VG1 is in the L level, the transistor PM1 of the buffer BUF1 is in the state of being ON and the transistor NM1 is in the state of being OFF. On the other hand, since the input voltage VG2 is in the H level, the transistor PM2 of the buffer BUFn is in the state of being OFF and the transistor NM2 is in the state of being ON. Accordingly, what is called a flow-through current, which is a current that flows from the transistor PM1 toward the transistor NM2 via the coupling line L1, occurs.

The abnormal current detecting circuit 21 illustrated in FIG. 1 is a circuit that detects an occurrence of such a flow-through current. In this embodiment, the abnormal current detecting circuit 21 detects occurrence of an abnormal current based on an electric potential of the node n1 in the buffer BUF1 and an electric potential of the node n2 in the buffer BUFn.

Figures 3A, 3B:
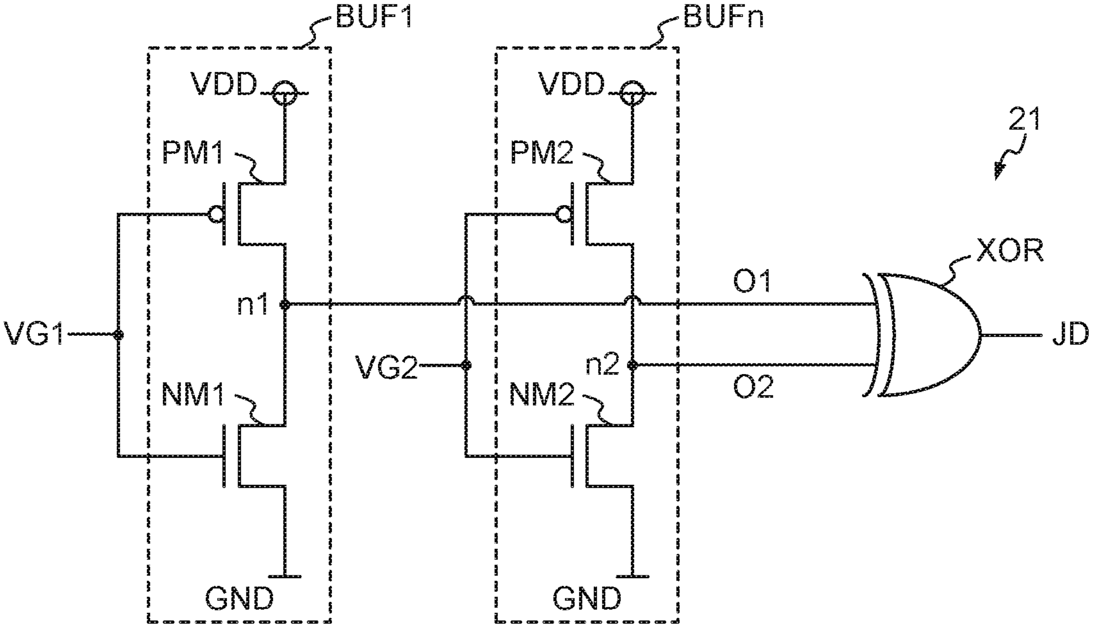
FIG. 3A is a circuit diagram illustrating a configuration of an abnormal current detecting circuit in Embodiment 1.
FIG. 3B is a drawing illustrating a truth table of an exclusive OR circuit.

FIG. 3A is a circuit diagram illustrating a configuration of the abnormal current detecting circuit 21. The abnormal current detecting circuit 21 is configured of an exclusive OR circuit XOR.

The exclusive OR circuit XOR has a first input terminal coupled to the node n1, which is a node coupling the respective drains of the transistors PM1 and NM1 of the buffer BUF1. The first input terminal of the exclusive OR circuit XOR is input with a first input voltage O1 that indicates the electric potential of the node n1 in two-valued voltage levels of "H" or "L."

The exclusive OR circuit XOR has a second input terminal coupled to the node n2, which is a node coupling the respective drains of the transistors PM2 and NM2 of the buffer BUFn. The second input terminal of the exclusive OR circuit XOR is input with a second input voltage O2 that indicates the electric potential of the node n2 in two-valued voltage levels of "H" or "L."

The exclusive OR circuit XOR outputs an exclusive OR of the first input voltage O1 and the second input voltage O2 as a determination result JD.

As described above, the buffers BUF1 and BUFn are preferred to operate at the same timing, and the state where the voltage levels of the output terminals of the buffers BUF1 and BUFn are both in the H level or L level is a "normal" state. On the other hand, when there occurs a time difference between the operation timings of the buffers BUF1 and BUFn, it is an "abnormal" state where an abnormal current (flow-through current) flows in the coupling line between the buffers. The exclusive OR circuit XOR outputs an L level signal that indicates that it is "normal" between the buffers or an H level signal that indicates that it is "abnormal" as the determination result JD.

FIG. 3B is a drawing illustrating a truth table of the exclusive OR circuit XOR. When the first input voltage O1 is in the H level and the second input voltage O2 is in the L level, the determination result JD as an output of the exclusive OR circuit XOR is the H level, that is, the determination result indicates "abnormal." When the first input voltage O1 is in the L level and the second input voltage O2 is in the H level, the determination result JD as an output of the exclusive OR circuit XOR is the H level, that is, the determination result indicates "abnormal."

On the other hand, when both the first input voltage O1 and the second input voltage O2 are in the L level, the determination result JD as an output of the exclusive OR circuit XOR is the L level, that is, the determination result indicates "normal." When both the first input voltage O1 and the second input voltage O2 are in the H level, the determination result JD as an output of the exclusive OR circuit XOR is the L level, that is, the determination result indicates "normal."

The determination result JD is supplied to the timing controller, which is not illustrated, disposed in the master IC 12. The timing controller in the master IC 12 adjusts the timings of outputting the input voltages VG1 and VG2 so as not cause a time difference between the timing of the voltage change of the input voltage VG1 applied to the buffer BUF1 and the timing of the voltage change of the input voltage VG2 applied to the buffer BUFn of the slave IC 13-*n* based on the determination result JD. This avoids the occurrence of the flow-through current.

As described above, in the display apparatus 100 of this embodiment, the abnormal current detecting circuit 21 is disposed in the master IC 12. The abnormal current detecting circuit 21 detects whether it is in the state causing the flow-through current to occur between the buffers BUF1 and BUFn or not. The abnormal current detecting circuit 21 is configured of the exclusive OR circuit XOR, and performs detection based on an electric potential of the connection node between the transistors PM1 and NM1 configuring the buffer BUF1 and an electric potential of the connection node between the transistors PM2 and NM2 configuring the buffer BUFn.

The display apparatus 100 of this embodiment allows suppressing the occurrence of the flow-through current between the buffers outputting the select signal SEL for time-divisional driving in the display apparatus that drives the data lines in a time divisional manner. Reducing the occurrence of the flow-through current allows suppressing EMI noise.

Embodiment 2

Next, Embodiment 2 of the disclosure will be described. A display apparatus of this embodiment is different from the display apparatus in Embodiment 1 in a configuration for detecting a state causing an abnormal current (flow-through current) to flow.

Figure 4:
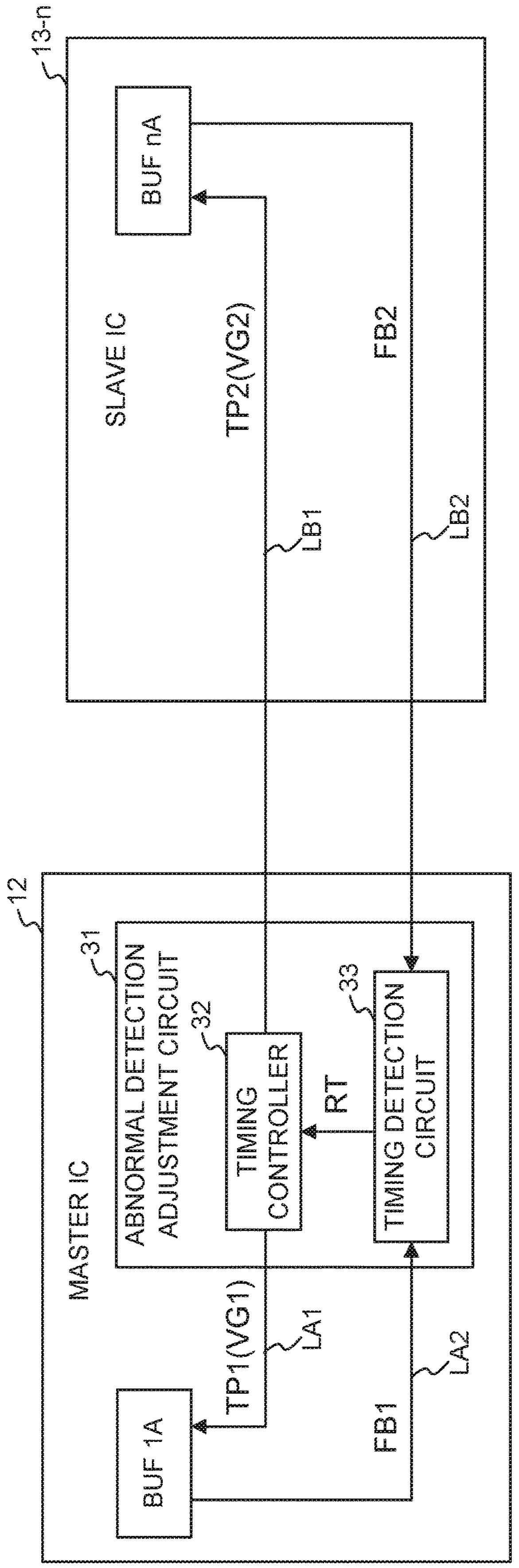
FIG. 4 is a block diagram illustrating a configuration of a driver IC including an abnormal current detecting circuit in Embodiment 2.

FIG. 4 is a block diagram simplistically illustrating parts of configurations of a master IC 12 and a slave IC 13-*n* of this embodiment.

The master IC 12 includes a buffer BUF1A and an abnormal detection adjustment circuit 31. The slave IC 13-*n* includes a buffer BUFnA.

The buffer BUF1A has a configuration similar to that of the buffer BUF1 in Embodiment 1, and is an output buffer that outputs a select signal SEL upon receiving an application of an input voltage VG1. Similarly, the buffer BUFnA has a configuration similar to that of the buffer BUFn in Embodiment 1, and is an output buffer that outputs a select signal SEL upon receiving an application of an input voltage VG2.

The abnormal detection adjustment circuit 31 is configured of a timing controller 32 and a timing detection circuit 33.

The timing controller 32 is coupled to the buffer BUF1A by a coupling line LA1. The timing controller 32 supplies the input voltage VG1 to the buffer BUF1A via the coupling line LA1.

The timing controller 32 is coupled to the buffer BUFnA of the slave IC 13-*n* by a coupling line LB1. The timing controller 32 supplies the input voltage VG2 to the buffer BUFnA via the coupling line LB1.

Note that the coupling line LB1 is longer than the coupling line LA1, and therefore, the time that takes since the input voltage VG2 is output until it reaches the buffer BUFnA is longer than the time that takes since the input voltage VG1 is output until it is supplied to the buffer BUF1A. In view of this, the timing controller 32 adjusts the timings of the outputs of the input voltages VG1 and VG2 so as to match the timing of the voltage change of the input voltage VG1 applied to the buffer BUF1A with the timing of the voltage change of the input voltage VG2 applied to the buffer BUFnA.

The timing controller 32 outputs test pulses TP1 and TP2 for adjusting the timings of outputting the input voltages VG1 and VG2. The timing controller 32 receives a reception timing signal RT supplied from the timing detection circuit 33 corresponding to the reception of the test pulses TP1 and TP2 by the buffers BUF1A and BUFnA, and adjusts the timings of outputting the input voltages VG1 and VG2.

The timing controller 32 supplies the test pulse TP1, which is one pulse signal having a predetermined pulse width, to the buffer BUF1A via the coupling line LA1. Similarly, the timing controller 32 supplies the test pulse TP2, which has a waveform similar to that of the test pulse TP1, to the buffer BUFnA via the coupling line LB1.

The buffer BUF1A of this embodiment has a function that supplies a feedback signal FB1 to the timing detection circuit 33 corresponding to the reception of the test pulse TP1 from the timing controller 32. The buffer BUF1A is coupled to the timing detection circuit 33 by the coupling line LA2, and supplies the feedback signal FB1 to the timing detection circuit 33 via the coupling line LA2.

The buffer BUFnA of this embodiment has a function that supplies a feedback signal FB2 to the timing detection circuit 33 corresponding to the reception of the test pulse TP2 from the timing controller 32. The buffer BUFnA is coupled to the timing detection circuit 33 by the coupling line LB2, and supplies the feedback signal FB2 to the timing detection circuit 33 via the coupling line LB2.

The feedback signals FB1 and FB2 are one pulse signals having predetermined pulse widths, and have waveforms similar to those of the test pulses TP1 and TP2.

Note that, while in FIG. 4, the coupling line LA1 and the coupling line LA2 are illustrated in different lengths for operation description, they have the same length in practice. Accordingly, when it is assumed that there is no signal delay, the lengths of the coupling lines LA1 and LA2 are designed so as to match the time that takes since the test pulse TP1 is output from the timing controller 32 until it reaches the buffer BUF1A with the time that takes since the feedback signal FB1 is output from the buffer BUF1A until it reaches the timing detection circuit 33.

Similarly, the coupling lines LB1 and LB2 have the same length. That is, the lengths of the coupling lines LB1 and LB2 are designed so as to match the time that takes since the test pulse TP2 is output from the timing controller 32 until it reaches the buffer BUFnA with the time that takes since the feedback signal FB2 is output from the buffer BUFnA until it reaches the timing detection circuit 33.

The timing detection circuit 33 receives the feedback signal FB1 and the feedback signal FB2, and outputs one pulse signals that indicate the respective reception timings as reception timing signals RT. The reception timing signal RT is supplied to the timing controller 32.

The timing controller 32 includes a pulse counter, which is not illustrated, and measures a time difference between the timings of receiving the reception timing signals RT with the pulse counter. The timing controller 32 adjusts the timings of outputting the input voltages VG1 and VG2 based on the measurement result by the pulse counter.

Figure 5:
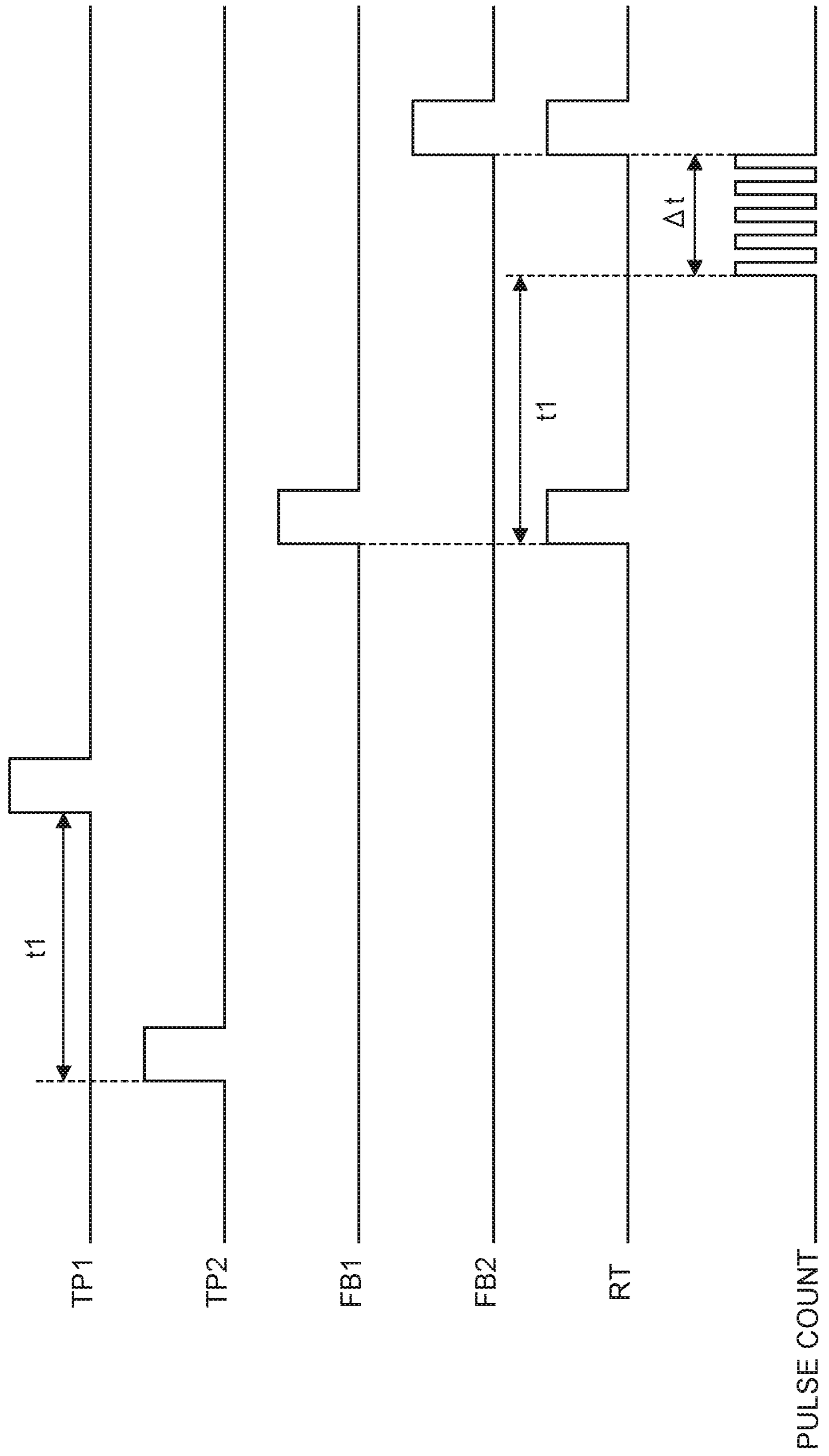
FIG. 5 is a timing chart illustrating examples of signal waveforms of respective signals in abnormal detection in Embodiment 2.

FIG. 5 is a timing chart illustrating exemplary signal waveforms of the respective signals in an abnormal detection operation of this embodiment.

The timing controller 32 firstly outputs the test pulse TP2 toward the buffer BUFnA whose coupling line (LB1) has a long distance. The timing controller 32 outputs the test pulse TP1 toward the buffer BUF1A whose coupling line (LA1) has a short distance in t1 seconds after the output of the test pulse TP2.

Note that, the "t1" as a time difference between the output timings of the test pulses TP1 and TP2 is set in consideration of the difference between the lengths of the coupling line LA1 and the coupling line LB1. Specifically, when it is assumed that there is no signal delay caused by a factor other than the lengths of the coupling lines, the time difference "t1" is set so as to match the time that takes for the test pulse TP1 to reach the buffer BUF1A with the time that takes for the test pulse TP2 to reach the buffer BUFnA.

The timing detection circuit 33 sequentially receives the feedback signals FB1 and FB2. As described above, when it is assumed that there is no signal delay caused by a factor other than the lengths of the coupling lines, the test pulse TP2 reaches the buffer BUFn simultaneously with the test pulse TP1 reaching the buffer BUF1A. Accordingly, the time difference "t1" occurs between the reception timings of the feedback signal FB1 and the feedback signal FB2 that are returned through the coupling lines having the same lengths as those of the test pulses. That is, when it is assumed that there is no signal delay caused by a factor other than the lengths of the coupling lines, the timing detection circuit 33 receives the feedback signal FB2 in t1 seconds after receiving the feedback signal FB1.

The timing detection circuit 33 outputs the reception timing signals RT at the timings where the respective feedback signals FB1 and FB2 are received. In the example illustrated in FIG. 5, the timing detection circuit 33 receives the feedback signal FB2 in (t1+Δt) seconds after receiving the feedback signal FB1. Accordingly, the timing detection circuit 33 outputs the reception timing signal RT again in (t1+Δt) seconds after outputting the reception timing signal RT.

The timing controller 32 starts counting pulse using a pulse counter in t1 seconds after receiving the reception timing signal RT, and measures the time difference Δt. The measured time difference Δt becomes a time difference equivalent to the time difference between the reception timings in the buffers BUF1A and BUFnA when the timing controller 32 outputs the input voltages VG1 and VG2. Accordingly, the timing controller 32 adjusts the timings of outputting the input voltages VG1 and VG2 based on the measured time difference Δt.

That is, when there is a time difference of (t1+Δt) in the receptions of the feedback signals FB1 and FB2 by the timing detection circuit 33, there occurs a time difference of Δt between the times at which the input voltages VG1 and VG2 reach the respective buffers BUF1A and BUFnA. Accordingly, the timing controller 32 adjusts the output timings so as to decrease the time difference Δt, and thus, the time difference between the timing at which the input voltage VG1 reaches the buffer BUF1A and the timing at which the input voltage VG2 reaches the buffer BUFnA can be decreased.

As described above, in the display apparatus of this embodiment, the abnormal detection adjustment circuit 31 (the timing controller 32, the timing detection circuit 33) outputs the test pulses (TP1, TP2) toward the buffers BUF1A and BUFnA. The abnormal detection adjustment circuit 31 adjusts the timings of outputting the input voltages VG1 and VG2 based on the time difference between the timings of the receptions of the feedback signals FB1 and FB1 from the buffers BUF1A and BUFnA.

The display apparatus of this embodiment ensures suppressing the occurrence of the flow-through current between the buffers by matching the timings of the input voltages supplied to the respective buffers. Reducing the occurrence of the flow-through current allows suppressing the EMI noise.

Note that the disclosure is not limited to the above-described embodiments. For example, in the above-described Embodiment 1, the example in which the abnormal current detecting circuit 21 is configured of the exclusive OR circuit XOR has been described. The abnormal current detecting circuit, however, is not limited to this, and it is only necessary to have a circuit configuration that can determine whether it is in a state causing the flow-through current to occur or not based on the electric potential of the node n1 and the electric potential of the node n2.

In the above-described Embodiment 2, there has been described the example in which the coupling lines LA1 and LA2 have the same lengths, and the coupling lines LB1 and LB2 have the same lengths. The relation of the lengths of the coupling lines, however, is not limited to this, and it is only necessary that the coupling lines LA1 and LA2, and LB1 and LB2 are designed to have respective lengths having a predetermined relation such that the timing difference between the receptions of the feedback signals FB1 and FB2 caused by the difference between the lengths of the coupling lines becomes the known timing difference corresponding to the timing difference between the outputs of the input voltages VG1 and VG2 (t1 in the above-described embodiment).

In the above-described Example 1 and Example 2, there has been described the example in which the operation timings of the output buffers in the master IC 12 and the slave IC 13-*n*, which are the driver ICs at both the ends among the plurality of driver ICs arranged along the extending direction of the gate lines $S_1$ to $S_m$, are adjusted to suppress the occurrence of the flow-through current. The driver ICs as the subjects of the timing adjustment, however, are not limited to the driver ICs at both the ends. The select signal SEL for driving the multiplex selector 14 in a time divisional manner can be configured to be output from another driver IC positioned between the master IC 12 and the slave IC 13-*n*, for example, a k-th slave IC 13-*k* (k is an integer that is 1 or more and less than n). In such a configuration, adjusting the timings of outputting the input voltage VG1 supplied to the buffer in the master IC 12 and the input voltage supplied to the buffer in the slave IC 13-*k* allows suppressing the occurrence of the flow-through current between the buffers.

In the above-described embodiment, there has been described the example in which the operation timings of the respective buffers are controlled in order to suppress the occurrence of the flow-through current between the buffers outputting the select signal SEL. It is, however, allowed to adjust the operation timings of the buffers outputting another signal using the adjustment of the operation timings of the buffers outputting the select signal SEL.

Figure 6:
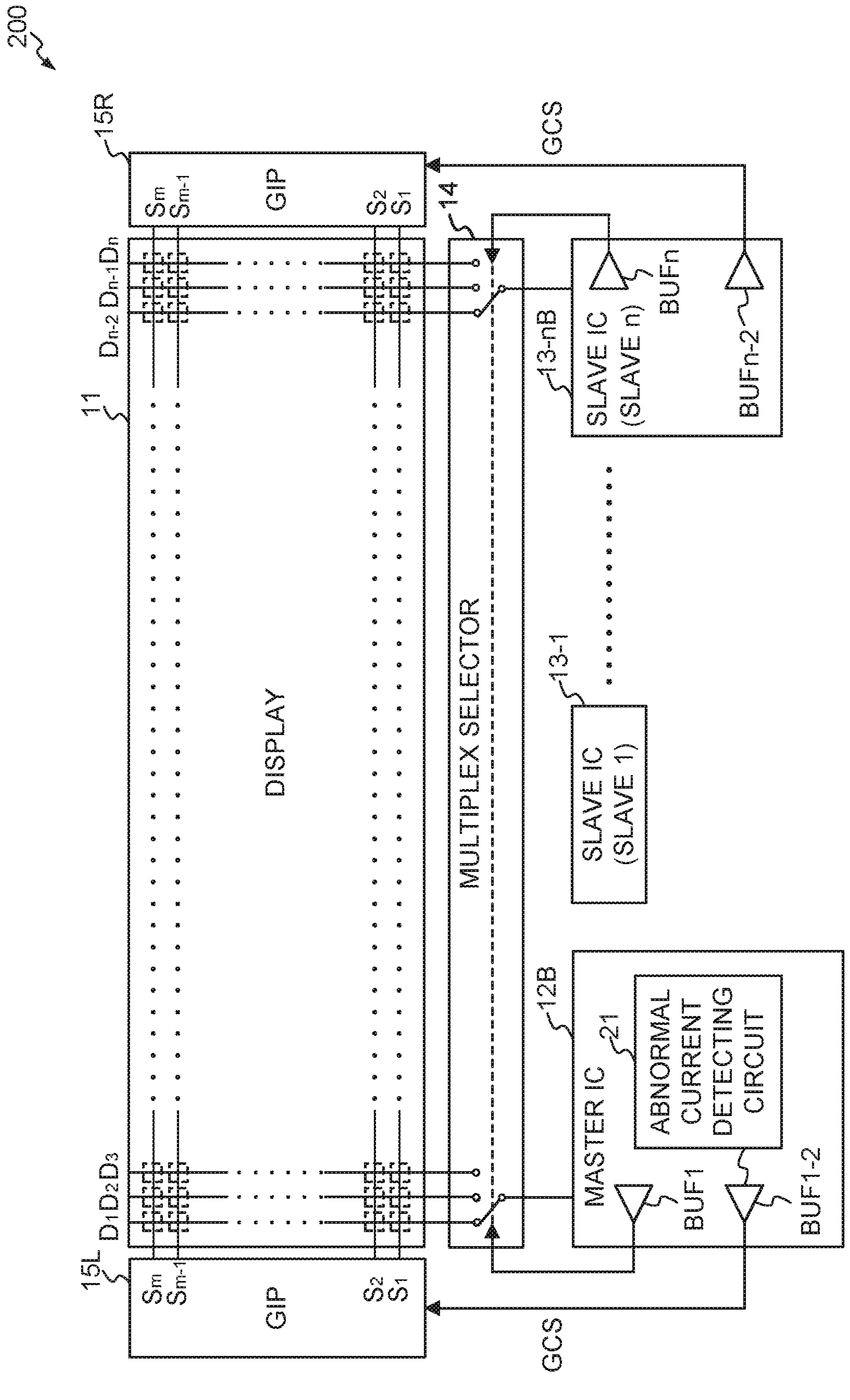
FIG. 6 is a block diagram illustrating a configuration of a display apparatus in a modification example.

FIG. 6 is a block diagram illustrating a configuration of a display apparatus 200 of a related modification example. The display apparatus 200 includes a display 11, a master IC 12B, slave ICs 13-1B to 13-nB, a multiplex selector 14, and GIPs 15L and 15R.

The master IC 12B includes a buffer BUF1-2 for outputting a gate control signal GCS. The gate control signal GCS output from the buffer BUF1-2 is supplied to the GIP 15L. The buffer BUF1-2 operates at the timing in conjunction with the operation of the buffer BUF1, and outputs the gate control signal GCS.

The slave IC 13-nB includes a buffer BUFn-2 for outputting the gate control signal GCS. The gate control signal GCS output from the buffer BUFn-2 is supplied to the GIP 15R. The buffer BUFn-2 operates at the timing in conjunction with the operation of the buffer BUFn, and outputs the gate control signal GCS.

A timing controller (not illustrated in FIG. 6) disposed in the master IC 12 controls the operation timings of the buffers BUF1 and BUFn by adjusting the timings of outputting the input voltages (VG1, VG2) supplied to the buffers BUF1 and BUFn in order to suppress the occurrence of the flow-through current between the buffers BUF1 to BUFn similarly to Embodiment 1 and Embodiment 2.

The timing controller controls the operation timings of the buffers BUF1-2 and buffer BUFn-2 in conjunction with the control of the operation timings of the buffers BUF1 and BUFn. This allows matching the timing at which the gate control signal GCS output from the buffer BUF1-2 is supplied to the GIP 15L with the timing at which the gate control signal GCS output from the buffer BUFn-2 is supplied to the GIP 15R.

While the above-described embodiments have described the display apparatus that drives the data lines in a time divisional manner as an example, the disclosure may be applied to a display apparatus that is not of a time division driving. In such a case, for example, without configuring the multiplex selector 14 in FIG. 1, the configuration may have the signal output terminals of the buffers BUF1 and BUFn being coupled to one another via a wiring.

What is claimed is:

1. A display apparatus comprising:

a display that includes a plurality of data lines and a plurality of gate lines, and a plurality of pixel portions disposed in a matrix at respective intersecting portions of the plurality of data lines and the plurality of gate lines;

a plurality of source drivers that each output a gradation voltage signal based on a video data signal; and a selector that receives a supply of a switching signal and switchably supplies the respective gradation voltage signals output from the plurality of respective source drivers to two or more data lines among the plurality of data lines according to the switching signal, wherein the plurality of source drivers include a first source driver that includes a first output buffer that outputs the switching signal and a second source driver that includes a second output buffer that outputs the switching signal, the first output buffer includes a first transistor and a second transistor that are coupled in a vertical row via a first node as an output terminal that outputs the switching signal and are turned ON and OFF complementarily upon receiving a voltage application on the respective control ends, the second output buffer includes a third transistor and a fourth transistor that are coupled in a vertical row via a second node as an output terminal that outputs the switching signal and are turned ON and OFF complementarily upon receiving a voltage application on the respective control ends, the first output buffer and the second output buffer have the respective output terminals electrically coupled to one another, and the first source driver includes an abnormal detection circuit that detects a state causing a flow-through current to occur between the output terminal of the first output buffer and the output terminal of the second output buffer.

2. The display apparatus according to claim 1, wherein the abnormal detection circuit detects the state causing the flow-through current to occur based on an electric potential of the first node and an electric potential of the second node.

3. The display apparatus according to claim 2, wherein the abnormal detection circuit has a first input terminal coupled to the first node and a second input terminal coupled to the second node, and includes an exclusive OR circuit that outputs an exclusive OR of the electric potential of the first node and the electric potential of the second node from an output end.

4. The display apparatus according to claim 2, wherein the first transistor is a first conductivity type transistor in which a first end receives an application of a power supply voltage and a second end is coupled to the first node, the second transistor is a second conductivity type transistor in which a first end is grounded and a second end is coupled to the first node, the third transistor is a first conductivity type transistor in which a first end receives an application of a power supply voltage and a second end is coupled to the second node, and the fourth transistor is a second conductivity type transistor in which a first end is grounded and a second end is coupled to the second node.

5. The display apparatus according to claim 1, wherein the abnormal detection circuit outputs a test signal toward the first output buffer and the second output buffer, the first output buffer transmits a first feedback signal toward the abnormal detection circuit corresponding to a reception of the test signal, the second output buffer transmits a second feedback signal toward the abnormal detection circuit corresponding to a reception of the test signal, and the abnormal detection circuit detects the state causing the flow-through current to occur based on a time difference between a timing of a reception of the first feedback signal and a timing of a reception of the second feedback signal.

6. The display apparatus according to claim 1, wherein the plurality of source drivers are arranged along an extending direction of the plurality of gate lines, the first source driver and the second source driver are source drivers positioned at both ends among the plurality of arranged source drivers, and the first output buffer and the second output buffer have respective output terminals electrically coupled by short-circuiting the output terminals on a panel that configures the display.

7. A source driver coupled to a display panel having a plurality of data lines and a plurality of gate lines and a plurality of pixel portions disposed in a matrix at respective intersecting portions of the plurality of data lines and the plurality of gate lines, the source driver outputting a gradation voltage signal based on a video data signal, the source driver comprising:

a plurality of driver ICs that are coupled to a selector that switchably supplies the gradation voltage signal output from the source driver to two or more data lines among the plurality of data lines according to a switching signal, and each output the gradation voltage signal, wherein the plurality of driver ICs include a first driver IC that has a first output buffer outputting the switching signal and a second driver IC that has a second output buffer outputting the switching signal, the first output buffer includes a first transistor and a second transistor that are coupled in a vertical row via a first node as an output terminal that outputs the switching signal and are turned ON and OFF complementarily upon receiving a voltage application on the respective control ends, the second output buffer includes a third transistor and a fourth transistor that are coupled in a vertical row via a second node as an output terminal that outputs the switching signal and are turned ON and OFF complementarily upon receiving a voltage application on the respective control ends, the first output buffer and the second output buffer have the respective output terminals electrically coupled, the first driver IC includes an abnormal detection circuit that detects a state causing a flow-through current to occur between the output terminal of the first output buffer and the output terminal of the second output buffer.

* * * * *